June 12, 1962  A. MANY ETAL  3,039,056
TESTING OF SEMICONDUCTORS
Filed Oct. 7, 1958

INVENTORS
ABRAHAM MANY
JESSE OROSHNIK
BY
ATTORNEY

United States Patent Office 3,039,056
Patented June 12, 1962

3,039,056
TESTING OF SEMICONDUCTORS
Abraham Many, Jamaica, and Jesse Oroshnik, New York, N.Y., assignors, by mesne assignments, to Sylvania Electric Products Inc., Wilmington, Del., a corporation of Delaware
Filed Oct. 7, 1958, Ser. No. 765,758
3 Claims. (Cl. 324—158)

Our invention relates to the measurement of electrical characteristics of semiconductor materials.

In the manufacture and preparation of semiconductor materials, such as, for example, germanium and silicon, it is important to know the direction and rate of resistivity change or variation in a given piece of material.

Conventional techniques for measuring such resistivity variations require the taking of measurements manually along different points on the surface of the semiconductor material. Such manual methods are entirely unsatisfactory for several reasons. First, the carrying out of such methods is very slow, delicate and painstaking. Furthermore, the measurements obtained lack the degree of accuracy required; consequently, a detailed picture of the resistivity variations throughout the material cannot be obtained. Still another disadvantage is the difficulty encountered when taking resistivity measurements while the crystal is maintained at very low temperatures, for example the temperature of liquid nitrogen.

Accordingly, it is an object of our invention to provide a method and apparatus for obtaining an accurate and detailed pattern of the resistivity variations throughout the body of a semiconductor material.

Another object is to produce a method and apparatus for obtaining resistivity measurements of the character indicated without the use of manual techniques and in a manner more rapid than heretofore possible.

Another object is to produce a method and apparatus for obtaining resistivity measurements of the character indicated with greater facility and convenience when the specimen to be measured is maintained at very low temperatures.

In accordance with the principles of our invention, we obtain a distribution pattern of the resistivity variations in the body of a semiconductor. This is achieved by first scanning successive portions of a surface of the semiconductor with a beam of radiant energy to produce an electric signal which varies in accordance with the resistivity gradient variations of the semiconductor body in the path of the radiant energy beam. The signal is then integrated and applied to the information display device for producing thereon a visual representation of the distribution pattern of the resistivity variations in the body of the semiconductor.

An illustrative embodiment of our invention will now be described in detail with reference to the accompanying drawings wherein.

Figure 1:
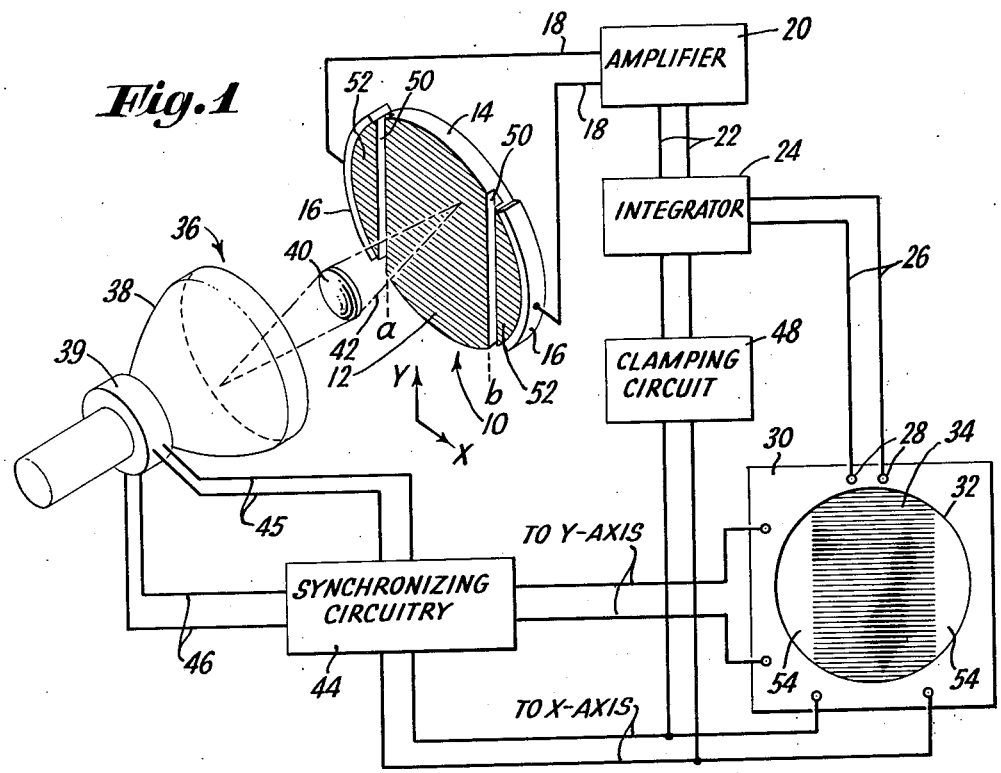
FIG. 1 shows a form of apparatus for carrying out the invention.

Referring now to FIG. 1, there is provided a thin wafer 10 of semiconductor material, the resistivity variations of which are to be observed in accordance with the method taught herein. The wafer is of substantially uniform thickness and has a planar front surface 12 and an edge 14. Two contacts 16 are soldered to opposite regions on the wafer edge and are connected by wires 18 to the input of an amplifier 20. The amplifier output is connected by wires 22 to the input of an integrator 24. The output of the integrator is connected by wires 26 to a pair of beam intensity modulating terminals 28 on an oscilloscope 30.

The oscilloscope 30 functions as an information display device and includes a cathode ray tube 32 for producing a visual representation of the pattern of resistivity variations 34 in the body of the semiconductor wafer 10.

A suitable scanning mechanism, for example, a flying spot scanner shown generally at 36 and including a tube 38 with appropriate circuitry, not shown, a deflection means 39 and a converging lens 40 is provided for scanning the front surface 12 of the semiconductor with a beam of light 42. The beam traverses the front surface 12 by a series of parallel lines, each line being parallel to an X axis and located at a different point on a Y axis. The beam is blanked out during the line retrace interval.

A suitable synchronizing circuit 44 is connected by wires 45 and 46 to the deflection means 39 on the flying spot scanner 36 and to both the X and Y axes of the oscilloscope. A clamping circuit 48 is also provided between the integrator 24 and the X axis of the oscilloscope. Together, the synchronizing and clamping circuits 44 and 48 insure that as the scanner 36 scans the surface of the wafer 10, the electron or writing beam of the cathode ray tube 32 will sweep out a corresponding raster on the tube face.

The operation of our device will now be explained. It is well known that photovoltages, due to resistivity variations or gradients can be produced in semiconductor materials when such materials are exposed to radiant energy. This phenomenon is generally referred to as the "bulk photovoltaic effect." Resistivity inhomogeneities in the material can be considered small junctions which allow a charge separation to take place, thereby producing a photovoltage signal when the semiconductor is exposed to radiant energy, for example, a light beam. The amplitude of this signal varies in accordance with the resistivity gradient variations of the semiconductor in the region about the impinging light beam.

The flat surfaces of the semiconductor wafer 10 which is to be investigated are first etched with a suitable etchant. This renders the semiconductor more sensitive to the light beam thereby increasing the photovoltage signals developed. Good results are obtained by etching with a solution comprising 40 cc. of concentrated nitric acid, 25 cc. of glacial acetic acid, 25 cc. of 48 percent hydrofluoric acid and 0.3 cc. of bromine.

Figure 2A:
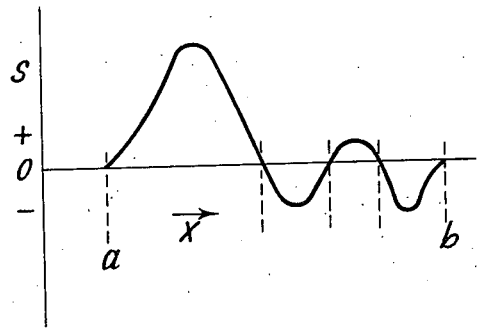
FIGS. 2a and 2b are graphs utilized in explaining the operation of the apparatus of FIG. 1.

The front surface 12 of the semiconductor wafer 10 is then scanned by the light beam 42, thereby producing a variable photovoltage signal between the contacts 16 for each line of scan. FIG. 2a shows a typical curve of photovoltage, S, vs. distance across the surface 12 in the X direction from $x=a$ to $x=b$ for one line in FIG. 1. This photovoltage signal is amplified by the amplifier 20 and applied to the integrator 24.

Figure 2B:
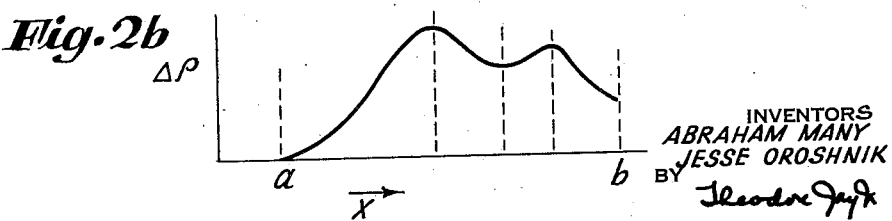

The photovoltage signal developed depends on the existence of a resistivity gradient, and this is a derivative quantity. The integral of the photovoltage therefore represents the resistivity change. Thus, by applying the photovoltage, S, FIG. 2a, to the input of the integrating circuit 24, the resultant output will correspond to the resistivity changes ($\Delta\rho$) in the semiconductor. This is clearly shown by the curve $\Delta\rho$, in FIG. 2b, which represents the output of the integrator 24 and is the integral of the photovoltage curve S in FIG. 2a.

The output signal from the integrator 24 is applied to the terminals 28 on the oscilloscope, wherein by appropriate circuitry within the oscilloscope, it modulates the cathode ray tube beam intensity. Since the scanner 36 is synchronized with the cathode ray tube beam, a pattern 34 corresponding to the resistivity changes in the semiconductor will be displayed on the tube screen. The screen areas of least light intensity variation will then correspond to those semiconductor areas having the least rate of resistivity change and the areas showing sharp intensity variations will correspond to the greatest rate of resistivity change. An operator can thus quickly and easily observe on the tube screen the resistivity change pattern 34 for the entire semiconductor body under the scanned surface 12. If desired, quantitative values of the resistivity changes throughout the semiconductor wafer can easily be determined by comparing the light intensities of the actual screen pattern to a standard intensity screen. This can be achieved by previously correlating the different intensities of the standard screen with corresponding known values of resistivity changes for semiconductor samples having approximately the same effective minority carrier lifetime.

Occasionally it may be necessary to obtain a resistivity change pattern of greater accuracy than that obtained by the above procedure. This can be accomplished by cutting two trenches 50 in the front surface 12 of the wafer 10 parallel to the Y axis. This substantially isolates the front surface areas 52 near the contacts 16 from the front surface central area between the trenches 50. This results in a more accurate resistivity change pattern over this central area because the areas 52 which show a distorted pattern due to their proximity to the contacts 16, are now isolated from the central area. If desired, the side areas on the cathode ray tube screen corresponding to the areas 52 on the wafer 10 can now be blanked off by a suitable opaque covering 54, so that only the central area is visible.

Our method can be employed for any material exhibiting the "bulk photovoltaic effect" to produce a resistivity change pattern thereof. This requires that the effective minority carrier lifetime of the sample be sufficiently large to give observable signals. This requirement can easily be met by germanium and silicon samples, which usually have a lifetime greater than one microsecond.

What is claimed is:

1. Apparatus for determining the resistivity variations in the body of a semiconductor comprising means for scanning successive portions of a surface of said body with an unmodulated beam of radiant energy to produce an electric signal which varies in accordance with the resistivity gradient variations of said body in the path of said beam, means for integrating said signal and means for deriving from said integrated signal a visual representation of the distribution pattern of the resistivity variations in the body of said semiconductor.

2. Apparatus for producing a distribution pattern of the resistivity variations in the body of a semiconductor comprising means for scanning successive portions of a surface of said body with an unmodulated beam of radiant energy to produce an electric signal which varies in accordance with the resistivity gradient variations of said body in the path of said radiant energy beam, means for integrating said electric signal, means for synchronizing the path of an electric beam on the face of a cathode ray tube with the path of said radiant energy beam across said body surface, and means for modulating the intensity of said electron beam with said integrated signal to thereby create on said tube face a visual representation of the pattern of the resistivity variations in the body of said semiconductor.

3. Apparatus for producing a distribution pattern of the resistivity variations in the body of a semiconductor comprising means for scanning successive portions of a surface of said body with an unmodulated beam of light to produce an electric signal having an amplitude which varies in accordance with the resistivity gradient variations of said body in the path of said light beam, means for amplifying said electric signal, means for integrating said amplified signal, means for synchronizing the path of an electron beam on the face of a cathode ray tube with the path of said radiant energy beam across said body surface, and means for modulating the intensity of said electron beam with said integrated signal to thereby create on said tube face a visual representation of the pattern of the resistivity variations in the body of said semiconductor.

References Cited in the file of this patent

UNITED STATES PATENTS

| 2,677,106 | Haynes | Apr. 27, 1954 |
| 2,777,113 | Packard | Jan. 8, 1957 |
| 2,790,952 | Pietenpol | Apr. 30, 1957 |
| 2,805,347 | Haynes | Sept. 3, 1957 |
| 2,811,890 | Wadey | Nov. 5, 1957 |

OTHER REFERENCES

"High Sensitivity Photo Conductor Layers," article in The Review of Scientific Instruments, July 1955, page 664 et. seq.

Johnson: "Journal of Applied Physics," vol. 28, No. 11, November 1957, pages 1349–1353.